(12) United States Patent
Yang et al.

(10) Patent No.: US 11,297,637 B2
(45) Date of Patent: Apr. 5, 2022

(54) METHOD FOR DATA TRANSMISSION BASED ON UPLINK GRANT, AND TERMINAL DEVICE THEREOF

(71) Applicant: GUANGDONG OPPO MOBILE TELECOMMUNICATIONS CORP., LTD., Guangdong (CN)

(72) Inventors: Ning Yang, Dongguan (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/331,942

(22) PCT Filed: Nov. 4, 2016

(86) PCT No.: PCT/CN2016/104712
§ 371 (c)(1),
(2) Date: Mar. 8, 2019

(87) PCT Pub. No.: WO2018/082046
PCT Pub. Date: May 11, 2018

(65) Prior Publication Data
US 2019/0239244 A1    Aug. 1, 2019

(51) Int. Cl.
*H04W 72/12* (2009.01)
*H04W 72/14* (2009.01)
(Continued)

(52) U.S. Cl.
CPC ..... *H04W 72/1284* (2013.01); *H04W 52/146* (2013.01); *H04W 52/242* (2013.01);
(Continued)

(58) Field of Classification Search
CPC .... H04L 1/0027; H04W 52/14; H04W 72/14; H04W 72/1268
See application file for complete search history.

(56) References Cited

U.S. PATENT DOCUMENTS

2009/0215464 A1*  8/2009  Tanno ............... H04W 74/0833
                                                455/450
2009/0323597 A1   12/2009  Harada
                           (Continued)

FOREIGN PATENT DOCUMENTS

CN    101361381 A    2/2009
CN    101478828 A    7/2009
                    (Continued)

OTHER PUBLICATIONS

R1-070718, "Preamble-Based Scheduling Request: Comparison with Other Solutions", Feb. 12-16, 2007, pp. 1-8 (Year: 2007).*
(Continued)

*Primary Examiner* — Salvador E Rivas
(74) *Attorney, Agent, or Firm* — Ladas & Parry, LLP

(57) ABSTRACT

Provided are a data transmission method and devices, which reduce data transmission delay. The method comprises: a terminal device notifies a network device of attribute information of uplink data to be sent of the terminal device via a scheduling request; the terminal device receives indication information sent by the network device, the indication information being used for indicating uplink authorisation for the uplink data to be sent; the terminal device sends the uplink data to be sent according to the uplink authorisation.

11 Claims, 6 Drawing Sheets

(51) Int. Cl.
    *H04W 52/14* (2009.01)
    *H04W 52/24* (2009.01)
(52) U.S. Cl.
    CPC ... *H04W 72/1268* (2013.01); *H04W 72/1278* (2013.01); *H04W 72/1289* (2013.01); *H04W 72/14* (2013.01); *H04W 52/14* (2013.01)

(56) References Cited

U.S. PATENT DOCUMENTS

| | | |
|---|---|---|
| 2010/0118857 A1 | 5/2010 | Chun |
| 2012/0044877 A1 | 2/2012 | Ratasuk |
| 2012/0236805 A1* | 9/2012 | Kuo ............... H04W 24/08 370/329 |
| 2013/0003650 A1 | 1/2013 | Han |
| 2016/0183219 A1 | 6/2016 | Kim et al. |
| 2016/0197846 A1 | 7/2016 | Bernstein |
| 2018/0199381 A1* | 7/2018 | Rong ............... H04W 74/08 |
| 2018/0227958 A1* | 8/2018 | Xiong ............. H04W 74/0833 |

FOREIGN PATENT DOCUMENTS

| | | | |
|---|---|---|---|
| CN | 101803237 A | 8/2010 | |
| CN | 102685895 A | 9/2012 | |
| CN | 104717757 A | 6/2015 | |
| CN | 105681478 A | 6/2016 | |
| CN | 105743622 A | 7/2016 | |
| EP | 2549708 A1 | 1/2013 | |
| EP | 2675081 A1 * | 12/2013 | ........ H04W 72/1278 |
| EP | 2675081 A1 | 12/2013 | |
| JP | 2010004544 A | 1/2010 | |
| JP | 2010110015 A | 5/2010 | |
| JP | 2010539783 A | 12/2010 | |
| KR | 20080077145 A | 8/2008 | |
| KR | 20090028443 A | 3/2009 | |
| RU | 2408169 C2 | 12/2010 | |
| WO | 2007055311 A1 | 5/2007 | |
| WO | 2009035301 A2 | 3/2009 | |
| WO | 2011113202 A1 | 9/2011 | |
| WO | 2012116604 A1 | 9/2012 | |
| WO | 2016049890 A1 | 4/2016 | |

OTHER PUBLICATIONS

Supplementary European Search Report in the European application No. 16920609.1, dated Jun. 21, 2019.
English translation of the Written Opinion of the International Search Authority in the international application No. PCT/CN2016/104712, dated Jun. 28, 2017.
Georgios Orfanos et al: "A Centralized MAC Protocol with QoS Support for Wireless LANs", IEEE International Symposium on Personal, Indoor and Mobile Radio Communications. PIMRC, IEEE; PI, XX, Sep. 1, 2007 (Sep. 1, 2007), p. 1-5, XP031168598, ISBN: 978-1-4244-1143-6 p. 2-p. 3; figure 1-4; table II.
International Search Report in international application No. PCT/CN2016/104712, dated Jun. 28, 2017, with English translation from WIPO.
Written Opinion of the International Search Authority in international application No. PCT/CN2016/104712, dated Jun. 28, 2017, with machine English translation from Google Translate.
First Office Action of the European application No. 16920609.1, dated Aug. 11, 2020.
First Office Action of the Brazilian application No. BR1120190085432, dated Sep. 8, 2020, dated Aug. 28, 2020.
First Office Action of the Singaporean application No. 11201903453X, dated Jun. 2, 2020.
Second Office Action of the Chinese application No. 201680089432.1, dated Jul. 8, 2020.
LG Electronics Inc. "Scheudling aspect with multiple eNB/gNBs", 3GPP TSG-RAN WG2 Meeting #95bis R2-166645, published on Oct. 1, 2016, Chapter 2.
Ericsson. "Uplink Dynamic Scheduling in NR", 3GPP TSG-RAN WG2 #95bis Tdoc R2-16799, published on Oct. 1, 2016, Chapter 2.2.
First Office Action of the Russian application No. 2019116282, dated Feb. 7, 2020.
First Office Action and search report of the Chinese application No. 201680089432.1, dated Apr. 3, 2020.
First Office Action of the Chilean application No. 201901133, dated Dec. 19, 2019.
Second Office Action of the Chilean application No. 201901133, dated Apr. 20, 2020.
Second Office Action of the Canadian application No. 3039394, dated Feb. 22, 2021.
First Office Action of the Japanese application No. 2019-516475, dated Oct. 30, 2020.
First Office Action of the Indian application No. 201917020112, dated Dec. 7, 2020.
First Office Action of the Israeli application No. 266014, dated Dec. 13, 2020.
First Office Action of the Indonesian application No. P00201904194, dated Apr. 26, 2021.
First Office Action of the Taiwanese application No. 106137717, dated May 25, 2021.
Second Office Action of the European application No. 16920609.1, dated Nov. 17, 2021.
Hirst Office Action of the Australian application No. 2016428457, dated Nov. 25, 2021.
Second Office Action of the Israeli application No. 266014, dated Nov. 22, 2021.

\* cited by examiner

METHOD FOR DATA TRANSMISSION BASED ON UPLINK GRANT, AND TERMINAL DEVICE THEREOF

CROSS-REFERENCE TO RELATED APPLICATION

The present application is the U.S. national phase application of PCT Application No. PCT/CN2016/104712 filed on Nov. 4, 2016, the disclosure of which is incorporated herein in its entirety by reference.

TECHNICAL FIELD

The disclosure relates to the field of communication, and more particularly, to a data transmission method, a terminal device and a network device.

BACKGROUND

With development of mobile communication technologies, a Fifth Generation (5G) mobile communication technology is under study at present. A factor which has relatively great influence on a user experience is data transmission latency.

Therefore, how to reduce a data transmission delay is a problem to be studied.

SUMMARY

Embodiments of the disclosure provide a data transmission method and device, which may reduce a data transmission latency.

A first aspect provides a data transmission method, which may include the following operations.

A terminal device notifies attribute information of uplink data to be sent by the terminal device to a network device through a scheduling request.

The terminal device receives indication information sent by the network device, the indication information indicating an uplink grant for the uplink data to be sent.

The terminal device sends the uplink data to be sent according to the uplink grant.

In such a manner, in the embodiments of the disclosure, the terminal device directly notifies the attribute information of the data to be sent to the network device through the scheduling request, the grant for the data may be sent according to the attribute information of the data and then the terminal device may send the data to be sent according to the grant for the data, so that the problem of excessively long latency brought by multiple interactions may be solved.

In combination with the first aspect, in a first optional implementation of the first aspect, the scheduling request may include an indication field, and the indication field may be configured to indicate the attribute information of the uplink data to be sent.

The operation that the terminal device notifies the attribute information of the uplink data to be sent by the terminal device to the network device through the scheduling request may include the following operation.

The terminal device notifies the attribute information of the uplink data to be sent to the network device through the indication field in the scheduling request.

In combination with the first aspect or any abovementioned possible implementation thereof, in a second optional implementation of the first aspect, the operation that the terminal device notifies the attribute information of the uplink data to be sent by the terminal device to the network device through the scheduling request may include the following operation.

The terminal device notifies the attribute information of the uplink data to be sent to the network device through at least one of a resource occupied by the scheduling request or target received power corresponding to the scheduling request.

In combination with the first aspect or any abovementioned possible implementation thereof, in a third optional implementation of the first aspect, the resource occupied by the scheduling request and configured to notify the attribute information of the uplink data to be sent to the network device may include at least one of:

a code-domain resource, a time-domain resource, a frequency-domain resource or a space-domain resource.

In combination with the first aspect or any abovementioned possible implementation thereof, in a fourth optional implementation of the first aspect, the operation that the terminal device notifies the attribute information of the uplink data to be sent to the network device through at least one of the resource occupied by the scheduling request or the target received power corresponding to the scheduling request may include the following operations.

The resource configured to send the scheduling request is determined according to the attribute information of the uplink data to be sent and correspondences between attribute information of data and resources.

The scheduling request is sent according to the determined resource.

In combination with the first aspect or any abovementioned possible implementation thereof, in a fifth optional implementation of the first aspect, the operation that the terminal device notifies the attribute information of the uplink data to be sent to the network device through at least one of the resource occupied by the scheduling request or the target received power corresponding to the scheduling request may include the following operations.

The target received power corresponding to the scheduling request configured to notify the attribute information of the uplink data to be sent is determined according to the attribute information of the uplink data to be sent and correspondences between attribute information of data and target received powers of a scheduling request.

Transmitted power is determined according to path loss between the network device and the terminal device and the target received power corresponding to the scheduling request.

The scheduling request is sent in the transmitted power.

In combination with the first aspect or any abovementioned possible implementation thereof, in a sixth optional implementation of the first aspect, the scheduling request may include a preamble.

In combination with the first aspect or any abovementioned possible implementation thereof, in a seventh optional implementation of the first aspect, the scheduling request may include the preamble and the indication field, the indication field indicating the attribute information of the uplink data to be sent.

In combination with the first aspect or any abovementioned possible implementation thereof, in an eighth optional implementation of the first aspect, the scheduling request may be physical-layer signaling.

In combination with the first aspect or any abovementioned possible implementation thereof, in a ninth optional implementation of the first aspect, the attribute information of the uplink data to be sent may include at least one of:

a size of the uplink data to be sent, data stream information corresponding to the uplink data to be sent, bearer information corresponding to the uplink data to be sent, logical channel information corresponding to the uplink data to be sent or Quality of Service (QoS) level information of the uplink data to be sent.

In combination with the first aspect or any abovementioned possible implementation thereof, in a tenth optional implementation of the first aspect, the uplink grant for the uplink data to be sent may contain at least one of:

a basic parameter set adopted to send the uplink data to be sent, a transport block size adopted to send the uplink data to be sent, a modulation and coding scheme adopted to send the uplink data to be sent, maximum power for sending of the uplink data to be sent, a resource adopted to send the uplink data to be sent or a Hybrid Automatic Repeat reQuest (HARQ) process number corresponding to the uplink data to be sent.

In combination with the first aspect or any abovementioned possible implementation thereof, in an eleventh optional implementation of the first aspect, the uplink grant for the uplink data to be sent may include identification information, and the identification information may be configured to index at least one of:

the basic parameter set adopted to send the uplink data to be sent, the transport block size adopted to send the uplink data to be sent, the modulation and coding scheme adopted to send the uplink data to be sent, the maximum power for sending of the uplink data to be sent, the resource adopted to send the uplink data to be sent or the HARQ process number corresponding to the uplink data to be sent.

In combination with the first aspect or any abovementioned possible implementation thereof, in a twelfth optional implementation of the first aspect, before the operation that the terminal device notifies the attribute information of the uplink data to be sent by the terminal device to the network device through the scheduling request, the method may further include the following operations.

Configuration information sent by the network device is received, the configuration information indicating at least one of the following information and/or a mapping relationship between the following information:

attribute information of at least one service, the resource for sending the scheduling request, the target received power corresponding to the scheduling request and the basic parameter set.

A second aspect provides a data transmission method, which is characterized by including the following operations.

A terminal device receives a first message sent by a network device, the first message including first configuration information configured for the terminal device to send a second message and second configuration information configured for the terminal device to send uplink data and the second message being configured to notify the network device that the terminal device has uplink data to be sent.

When the uplink data to be sent exists, the terminal device sends the second message to the network device according to the first configuration information.

After the second message is sent, the terminal device sends the uplink data to be sent to the network device according to the second configuration information.

In such a manner, in the embodiments of the disclosure, the network device sends the first message to the terminal device, the first message including the first configuration information configured for the terminal device to send the second message and the second configuration information configured for the terminal device to send the uplink data and the second message being configured to notify the network device that the terminal device has the uplink data to be sent, and the terminal device, when there is data to be sent, may send the second message to the network device according to the first configuration information and, after sending the second message, directly sends the uplink data to be sent, so that the problem of excessively long latency brought by the fact that the terminal device requests the network device for a grant only when there is data to be sent may be solved.

In combination with the second aspect, in a first possible implementation of the second aspect, the method may further include the following operation.

The terminal device receives a response message sent by the network device for the second message.

The operation that the uplink data to be sent is sent to the network device according to the second configuration information after the second message is sent may include the following operation.

After the second message is sent and the response message is received, the uplink data to be sent is sent to the network device.

In combination with the second aspect or any abovementioned possible implementation thereof, in a second possible implementation of the second aspect, the operation that the uplink data to be sent is sent to the network device according to the second configuration information after the second message is sent may include the following operation.

The uplink data to be sent is sent to the network device according to the second configuration information after a predetermined time period from beginning of sending of the second message.

In combination with the second aspect or any abovementioned possible implementation thereof, in a third possible implementation of the second aspect, the second message may include an indication field, and the indication field may be configured to indicate attribute information of the uplink data to be sent.

In combination with the second aspect or any abovementioned possible implementation thereof, in a fourth possible implementation of the second aspect, the method may further include the following operation.

The terminal device notifies the attribute information of the uplink data to be sent to the network device through at least one of a resource occupied by the second message or target received power corresponding to the second message.

In combination with the second aspect or any abovementioned possible implementation thereof, in a fifth possible implementation of the second aspect, the resource occupied by the second message and configured to notify the attribute information of the uplink data to be sent to the network device may include at least one of:

a code-domain resource, a time-domain resource, a frequency-domain resource or a space-domain resource.

In combination with the second aspect or any abovementioned possible implementation thereof, in a sixth possible implementation of the second aspect, the operation that the terminal device notifies the attribute information of the uplink data to be sent to the network device through at least one of the resource occupied by the second message or the received power corresponding to the second message may include the following operations.

The target received power of the second message configured to notify the attribute information of the uplink data to be sent by the terminal device to the network device is determined according to the attribute information of the uplink data to be sent and correspondences between attribute information of data and target received powers of a second message.

Transmitted power is determined according to path loss between the network device and the terminal device and the target received power for the second message.

The second message is sent in the transmitted power.

In combination with the second aspect or any abovementioned possible implementation thereof, in a seventh possible implementation of the second aspect, the attribute information of the uplink data to be sent may include at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

In combination with the second aspect or any abovementioned possible implementation thereof, in an eighth possible implementation of the second aspect, the second message may include a preamble.

In combination with the second aspect or any abovementioned possible implementation thereof, in a ninth possible implementation of the second aspect, the first configuration information may include at least one of:

the code-domain resource configured to send the second message, the time-domain resource configured to send the second message, the frequency-domain resource configured to send the second message, the space-domain resource configured to send the second message or the target received power for the second message.

In combination with the second aspect or any abovementioned possible implementation thereof, in a tenth possible implementation of the second aspect, the second configuration information may include at least one of:

a basic parameter set adopted to send the uplink data, a transport block size adopted to send the uplink data, a modulation and coding scheme adopted to send the uplink data, maximum power for sending of the uplink data, a resource adopted to send the uplink data or a HARQ process number corresponding to the uplink data.

In combination with the second aspect or any abovementioned possible implementation thereof, in an eleventh possible implementation of the second aspect, the second configuration information may include identification information, and the identification information may be configured to index at least one of:

the basic parameter set adopted to send the uplink data, the transport block size adopted to send the uplink data, the modulation and coding scheme adopted to send the uplink data, the maximum power for sending of the uplink data, the resource adopted to send the uplink data or the HARQ process number corresponding to the uplink data.

In combination with the second aspect or any abovementioned possible implementation thereof, in a twelfth possible implementation of the second aspect, the second configuration information may be configured according to at least one of a bearer, logical channel, data stream or data volume to be sent corresponding to the uplink data of the terminal device.

A third aspect provides a data transmission method, which may include the following operations.

A network device acquires attribute information of uplink data to be sent by a terminal device through a scheduling request sent by the terminal device.

The network device determines an uplink grant for the uplink data to be sent by the terminal device according to the attribute information of the uplink data to be sent by the terminal device.

The network device sends indication information to the terminal device, the indication information indicating the uplink grant for the uplink data to be sent.

In combination with the third aspect, in a first possible implementation of the third aspect, the scheduling request may include an indication field, and the indication field may be configured to indicate the attribute information of the uplink data to be sent by the terminal device.

The operation that the network device acquires the attribute information of the uplink data to be sent by the terminal device through the scheduling request sent by the terminal device may include the following operation.

The network device acquires the attribute information of the uplink data to be sent by the terminal device through the indication field in the scheduling request sent by the terminal device.

In combination with the third aspect or any abovementioned possible implementation thereof, in a second possible implementation of the third aspect, the operation that the network device acquires the attribute information of the uplink data to be sent by the terminal device through the scheduling request sent by the terminal device may include the following operation.

The network device acquires the attribute information of the uplink data to be sent by the terminal device through at least one of a resource occupied by the scheduling request or received power corresponding to the scheduling request.

In combination with the third aspect or any abovementioned possible implementation thereof, in a third possible implementation of the third aspect, the resource occupied by the scheduling request and configured for the network device to acquire the attribute information of the uplink data to be sent may include at least one of:

a code-domain resource, a time-domain resource, a frequency-domain resource or a space-domain resource.

In combination with the third aspect or any abovementioned possible implementation thereof, in a fourth possible implementation of the third aspect, the scheduling request may include a preamble.

In combination with the third aspect or any abovementioned possible implementation thereof, in a fifth possible implementation of the third aspect, the scheduling request may include the preamble and the indication field, the indication field indicating the attribute information of the uplink data to be sent.

In combination with the third aspect or any abovementioned possible implementation thereof, in a sixth possible implementation of the third aspect, the scheduling request may be physical-layer signaling.

In combination with the third aspect or any abovementioned possible implementation thereof, in a seventh possible implementation of the third aspect, the attribute information of the uplink data to be sent by the terminal device may include at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

In combination with the third aspect or any abovementioned possible implementation thereof, in an eighth possible implementation of the third aspect, the uplink grant for the uplink data to be sent by the terminal device may contain at least one of:

a basic parameter set adopted to send the uplink data to be sent, a transport block size adopted to send the uplink data to be sent, a modulation and coding scheme adopted to send the uplink data to be sent, maximum power for sending of the uplink data to be sent, a resource adopted to send the uplink data to be sent or a HARQ process number corresponding to the uplink data to be sent.

In combination with the third aspect or any abovementioned possible implementation thereof, in a ninth possible implementation of the third aspect, the uplink grant for the uplink data to be sent by the terminal device may include identification information, and the identification information may be configured to index at least one of:

the basic parameter set adopted to send the uplink data to be sent, the transport block size adopted to send the uplink data to be sent, the modulation and coding scheme adopted to send the uplink data to be sent, the maximum power for sending of the uplink data to be sent, the resource adopted to send the uplink data to be sent or the HARQ process number corresponding to the uplink data to be sent.

In combination with the third aspect or any abovementioned possible implementation thereof, in a tenth possible implementation of the third aspect, before the operation that the network device acquires the attribute information of the uplink data to be sent by the terminal device through the scheduling request sent by the terminal device, the method may further include the following operation.

The network device sends configuration information to the terminal device, the configuration information indicating attribute information of at least one type of data and the configuration information indicating at least one of the following information and/or a mapping relationship between the following information:

attribute information of at least one service, the resource for sending the scheduling request, the target received power corresponding to the scheduling request and the basic parameter set.

A fourth aspect provides a data transmission method, which may include the following operations.

A network device sends a first message to a terminal device, the first message including first configuration information configured for the terminal device to send a second message and second configuration information configured for the terminal device to send uplink data and the second message being configured to notify the network device that the terminal device has uplink data to be sent.

The network device receives the second message sent by the terminal device.

After the second message is received, the network device monitors the uplink data sent by the terminal device.

In combination with the fourth aspect, in a first possible implementation of the fourth aspect, the method may further include the following operation.

A response message for the second message is sent to the terminal device.

The operation that the uplink data sent by the terminal device is monitored after the second message is received may include the following operation.

After the second message is received and the response message is sent, the uplink data sent by the terminal device is monitored.

In combination with the fourth aspect or any abovementioned possible implementation thereof, in a second possible implementation of the fourth aspect, the operation that the network device monitors the uplink data sent by the terminal device after the second message is received may include the following operation.

The network device monitors the uplink data sent by the terminal device after a predetermined time period from beginning of sending the second message.

In combination with the fourth aspect or any abovementioned possible implementation thereof, in a third possible implementation of the fourth aspect, the method may further include the following operation.

Attribute information of the uplink data to be sent by the terminal device is acquired through the second message.

The operation that the uplink data sent by the terminal device is monitored may include the following operation.

The uplink data sent by the terminal device is monitored according to the attribute information of the uplink data.

In combination with the fourth aspect or any abovementioned possible implementation thereof, in a fourth possible implementation of the fourth aspect, the second message may include indication information, and the operation that the attribute information of the uplink data to be sent by the terminal device is acquired through the second message may include the following operation.

The attribute information of the uplink data to be sent by the terminal device is acquired through the indication information contained in the second message sent by the terminal device.

In combination with the fourth aspect or any abovementioned possible implementation thereof, in a fifth possible implementation of the fourth aspect, the operation that the attribute information of the uplink data to be sent by the terminal device is acquired through the second message may include the following operation.

The network device acquires the attribute information of the uplink data to be sent by the terminal device through at least one of a resource occupied by the second message or target received power corresponding to the second message.

In combination with the fourth aspect or any abovementioned possible implementation thereof, in a sixth possible implementation of the fourth aspect, the resource occupied by the second message and configured to notify the attribute information of the uplink data to the network device may include at least one of:

a code-domain resource, a time-domain resource, a frequency-domain resource or a space-domain resource.

In combination with the fourth aspect or any abovementioned possible implementation thereof, in a seventh possible implementation of the fourth aspect, the attribute information of the uplink data may include at least one of:

a size of the uplink data, data stream information corresponding to the uplink data, bearer information corresponding to the uplink data, logical channel information corresponding to the uplink data or QoS level information of the data.

In combination with the fourth aspect or any abovementioned possible implementation thereof, in an eighth possible implementation of the fourth aspect, the second message may include a preamble.

In combination with the fourth aspect or any abovementioned possible implementation thereof, in a ninth possible implementation of the fourth aspect, the first configuration information may include at least one of:

the code-domain resource configured to send the second message, the time-domain resource configured to send the second message, the frequency-domain resource configured to send the second message, the space-domain resource configured to send the second message or the target received power for the second message.

In combination with the fourth aspect or any abovementioned possible implementation thereof, in a tenth possible implementation of the fourth aspect, the second configuration information may include at least one of:

a basic parameter set adopted to send the uplink data, a transport block size adopted to send the uplink data, a modulation and coding scheme adopted to send the uplink data, maximum power for sending of the uplink data, a resource adopted to send the uplink data or a HARQ process number corresponding to the uplink data.

In combination with the fourth aspect or any abovementioned possible implementation thereof, in an eleventh possible implementation of the fourth aspect, the second configuration information may include identification information, and the identification information may be configured to index at least one of:

the basic parameter set adopted to send the uplink data, the transport block size adopted to send the uplink data, the modulation and coding scheme adopted to send the uplink data, the maximum power for sending of the uplink data, the resource adopted to send the uplink data or the HARQ process number corresponding to the uplink data.

In combination with the fourth aspect or any abovementioned possible implementation thereof, in a twelfth possible implementation of the fourth aspect, the second configuration information may be configured according to at least one of a bearer, logical channel, data stream or data volume to be sent corresponding to the uplink data of the terminal device.

A fifth aspect provides a terminal device, which includes units configured to execute the method in the first aspect or each implementation thereof or includes units configured to execute the method in the second aspect or each implementation thereof.

A sixth aspect provides a network device, which includes units configured to execute the method in the third aspect or each implementation thereof and units configured to execute the method in the fourth aspect or each implementation thereof.

A seventh aspect provides a terminal device, which includes a processor and a memory. The memory is configured to store a program code. The processor is configured to call the program code stored in the memory to execute the method in the first aspect or each implementation thereof or execute the method in the second aspect or each implementation thereof.

An eighth aspect provides a network device, which includes a processor and a memory. The memory is configured to store a program code. The processor is configured to call the program code stored in the memory to execute the method in the third aspect or each implementation thereof or execute the method in the fourth aspect or each implementation thereof.

A ninth aspect provides a computer-readable medium, which stores a program code configured to be executed by a terminal device, the program code including an instruction configured to execute the method in the first aspect or each implementation thereof or including an instruction configured to execute the method in the second aspect or each implementation thereof.

A tenth aspect provides a computer-readable medium, which stores a program code configured to be executed by a network device, the program code including an instruction configured to execute the method in the third aspect or each implementation thereof and including an instruction configured to execute the method in the fourth aspect or each implementation thereof.

An eleventh aspect provides a system chip, which includes an input interface, an output interface, a processor and a memory. The processor is configured to execute a code in the memory. When the code is executed, the processor may implement the method in the first aspect and each implementation or the method in the second aspect and each implementation.

A twelfth aspect provides a system chip, which includes an input interface, an output interface, a processor and a memory. The processor is configured to execute a code in the memory. When the code is executed, the processor may implement the method in the third aspect and each implementation or the method in the fourth aspect and each implementation.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be described below in combination with the drawings in the embodiments of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
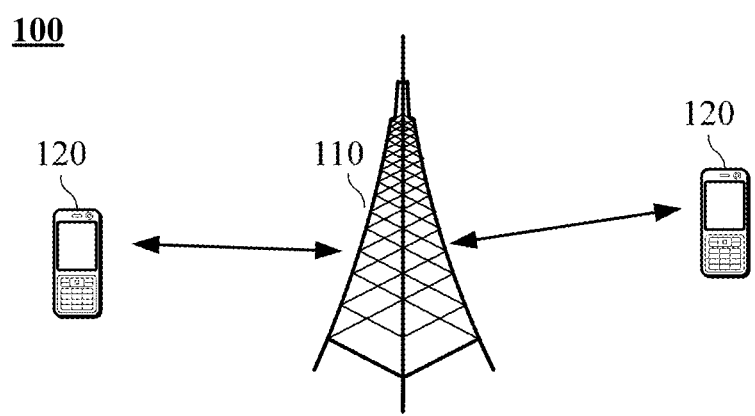
FIG. 1 is a schematic diagram of a communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 located within the coverage of the network device 110. The terminal devices 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the 5G system or network may also be called a New Radio (NR) system or network.

A network device and two terminal devices are exemplarily shown in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
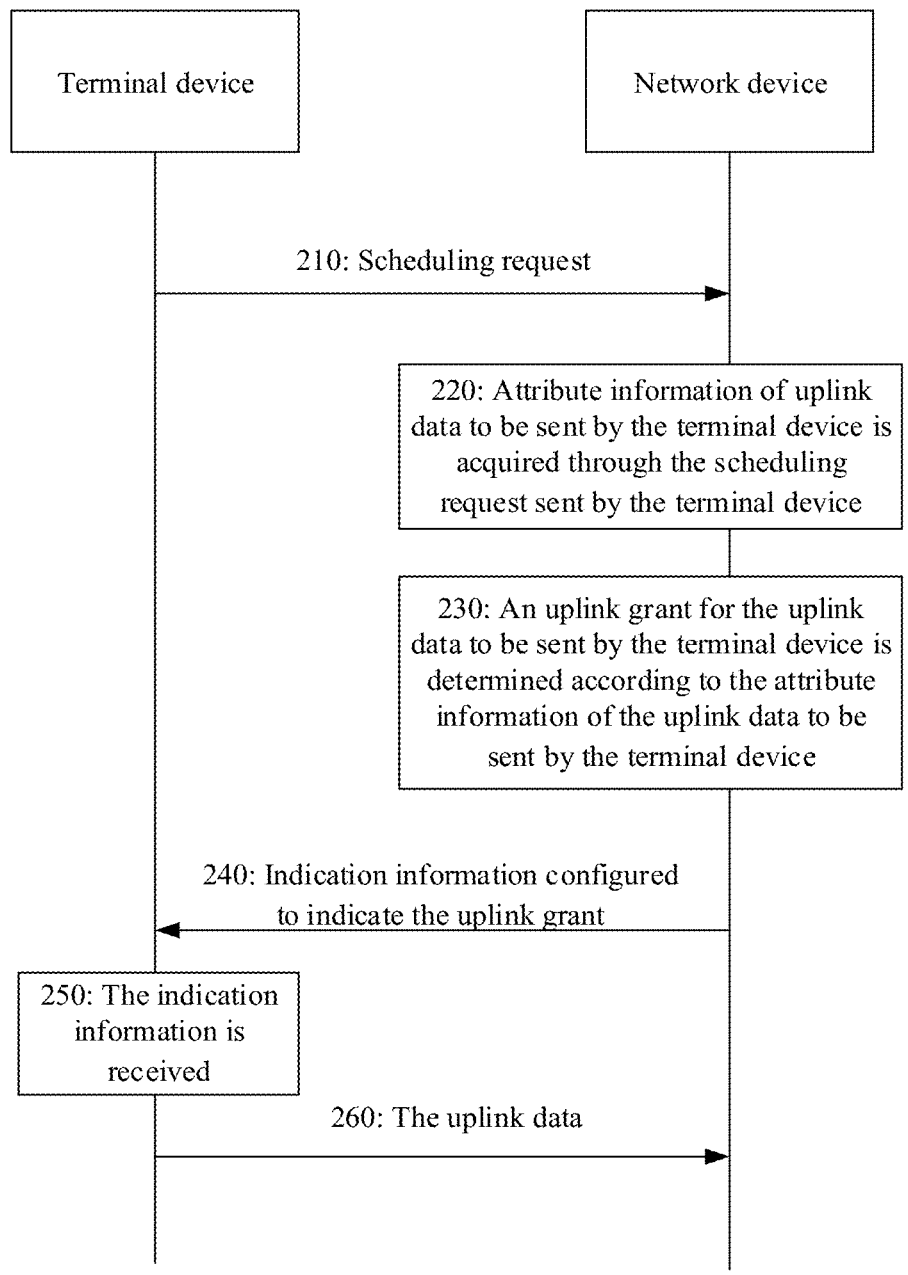
FIG. 2 is a schematic flowchart of a data transmission method according to an embodiment of the disclosure.

FIG. 2 is a schematic flowchart of a data transmission method 200 according to an embodiment of the disclosure. As shown in FIG. 2, the method 200 includes the following contents.

In 210, a terminal device notifies attribute information of uplink data to be sent by the terminal device to a network device through a scheduling request.

In 220, the network device acquires the attribute information of the uplink data to be sent by the terminal device through the scheduling request sent by the terminal device.

Optionally, the attribute information of the uplink data to be sent includes at least one of: a size of the uplink data to be sent, data stream information (for example, a data stream Identifier (ID)) corresponding to the uplink data to be sent, bearer information (for example, a bearer ID) corresponding to the uplink data to be sent, logical channel information (for example, a logical channel ID) corresponding to the uplink data to be sent and QoS level information of the uplink data to be sent.

Optionally, in the embodiment of the disclosure, if a size of a data block to be sent of a service is fixed, the size of the data to be sent may not be contained in the scheduling request.

Optionally, in the embodiment of the disclosure, no other information but only the size of the data to be sent may also be contained in the scheduling request.

Optionally, in the embodiment of the disclosure, the terminal device may send the scheduling request to the network device under the condition that existence of the uplink data to be sent is determined.

Optionally, in the embodiment of the disclosure, the scheduling request includes a preamble.

Optionally, in the embodiment of the disclosure, the scheduling request is physical-layer signaling.

Optionally, in the embodiment of the disclosure, the scheduling request includes an indication field, and the indication field indicates the attribute information of the uplink data to be sent. The terminal device notifies the attribute information of the uplink data to be sent to the network device through the indication field in the scheduling request, so that the network device may acquire the attribute information of the uplink data to be sent according to the indication field in the scheduling request.

Optionally, the scheduling request includes the preamble and the indication field, the indication field indicating the attribute information of the uplink data to be sent.

Optionally, the indication field may be at a front-end position or rear-end position of the preamble and may also be at a middle position of the preamble.

Optionally, in the embodiment of the disclosure, the terminal device notifies the attribute information of the uplink data to be sent to the network device through at least one of a resource occupied by the scheduling request or target received power corresponding to the scheduling request.

In an implementation, the terminal device determines the resource configured to send the scheduling request according to the attribute information of the uplink data to be sent and correspondences between attribute information of data and resources, and sends the scheduling request according to the determined resource. Correspondingly, the network device may determine the attribute information of the uplink data to be sent by the terminal device according to the resource occupied by the received scheduling request.

Optionally, in the embodiment of the disclosure, the resource occupied by the scheduling request and configured to notify the attribute information of the uplink data to be sent to the network device includes at least one of:

a code-domain resource, a time-domain resource, a frequency-domain resource or a space-domain resource.

Optionally, the space-domain resource may refer to a beam sending the scheduling request.

In an implementation, the terminal device determines the target received power corresponding to the scheduling request configured to notify the attribute information of the uplink data to be sent according to the attribute information of the uplink data to be sent and correspondences between attribute information of data and target received powers of a scheduling request, determines transmitted power according to path loss between the network device and the terminal device and the target received power corresponding to the scheduling request and sends the scheduling request in the transmitted power. Therefore, the network device may determine the attribute information of the uplink data to be sent according to the received power for the scheduling request.

For example, the terminal device may acquire the transmitted power P according to the following formula:

$$P=P\text{pathloss}+P\text{target}+\text{delta},$$

where Ppathloss is a path loss value calculated according to a downlink signal, Ptarget is an expected received power value configured for the scheduling request by the network device and delta is a power headroom configured by the network device.

In an implementation, the attribute information of the uplink data to be sent may be indicated through both of the resource occupied by the scheduling request and the target received power for the scheduling request.

In 230, the network device determines an uplink grant for the uplink data to be sent by the terminal device according to the attribute information of the uplink data to be sent by the terminal device.

Optionally, the uplink grant for the uplink data to be sent contains at least one of:

a basic parameter set adopted to send the uplink data to be sent, a transport block size adopted to send the uplink data to be sent, a modulation and coding scheme adopted to send the uplink data to be sent, maximum power for sending of the uplink data to be sent, a resource adopted to send the uplink data to be sent or a HARQ process number corresponding to the uplink data to be sent.

Optionally, the uplink grant for the uplink data to be sent includes identification information, and the identification information is configured to index at least one of:

the basic parameter set adopted to send the uplink data to be sent, the transport block size adopted to send the uplink data to be sent, the modulation and coding scheme adopted to send the uplink data to be sent, the maximum power for sending of the uplink data to be sent, the resource adopted to send the uplink data to be sent or the HARQ process number corresponding to the uplink data to be sent.

Optionally, a mapping relationship between identification information and each parameter may be predetermined by a protocol or configured for the terminal device by the network device.

Optionally, in the embodiment of the disclosure, the basic parameter set may include at least one of: a subcarrier spacing, a subcarrier number under a specific bandwidth, a subcarrier number of a Physical Resource Block (PRB), a length of an Orthogonal Frequency Division Multiplexing (OFDM) symbol, a length of a Cyclic Prefix (CP) of the OFDM symbol, the point number of Fourier transform or inverse Fourier transform configured to generate the OFDM signal, an OFDM symbol number of a Transmission Time Interval (TTI) and the number of TTIs in a specific time length.

In 240, the network device sends indication information to the terminal device, the indication information indicating the uplink grant for the uplink data to be sent.

In 250, the terminal device receives the indication information sent by the network device, the indication information indicating the uplink grant for the uplink data to be sent.

In 260, the terminal device sends the uplink data to be sent according to the uplink grant.

Specifically, the terminal device generates an uplink data Protocol Data Unit (PDU) according to the uplink grant.

Optionally, in the embodiment of the disclosure, before the terminal device notifies the attribute information of the uplink data to be sent by the terminal device to the network device through the scheduling request, the network device may send configuration information to the terminal device, the configuration information indicating at least one of the following information and/or a mapping relationship between the following information:

attribute information of at least one service, the resource for sending the scheduling request, the target received power corresponding to the scheduling request and the basic parameter set.

Optionally, the configuration information may be born through high-layer signaling, for example, Radio Resource Control (RRC)-layer signaling or Media Access Control (MAC)-layer signaling.

Optionally, the attribute information of the service may include at least one of data stream information, bearer information, logical channel information and a data volume to be sent.

Optionally, the data volume to be sent in the attribute information of the service may be a numerical value and may also be a numerical range.

Optionally, the attribute information, mentioned in the embodiment of the disclosure, of the data, may include attribute information of a service to which the data belongs.

Optionally, the information and mapping relationship between the information, which are indicated by the configuration information, may be as follows:

1) for each service: {the data stream information and/or the bearer information and/or the logical channel information, {the data volume to be sent, scheduling request resource information}, basic parameter set information}, such a configuration being adapted to the condition that a basic parameter set is configured for each service; or, 2) for each service: {the data stream information and/or the bearer information and/or the logical channel information, {the data volume to be sent, the scheduling request resource information} }, and for all the services: {available basic parameter set information}, such a configuration being adapted to the basic parameter set which may be used by the terminal for all the services; or, 3) {the data volume to be sent, the scheduling request resource information} and {the available basic parameter set information}; or, 4) for each service: {the data stream information and/or the bearer information and/or the logical channel information, the scheduling request resource information, the basic parameter set information}, such a configuration being adapted to a scenario that the data block to be sent is fixed or variable in a certain range;

5) {the data volume to be sent, the expected received power value for the scheduling request} and {the available basic parameter set information}, such a configuration being adapted to a scenario that the data stream information, bearer information and logical channel information of the service are neglected; or, 6) for each service: {the data stream information and/or the bearer information and/or the logical channel information, the expected received power value for the scheduling request, the basic parameter set information}, such a configuration being adapted to a scenario that the data block to be sent is fixed or variable in a certain range.

Optionally, the abovementioned data volume to be sent refers to a volume of data to be sent, may be a numerical value and may also be a numerical range. The data volume may be an absolute value (dBm) or a relative value (dB).

Optionally, {the data volume to be sent, the scheduling request resource information} may refer to configuration of a specific scheduling request resource for the data volume to be sent.

It is to be understood that the abovementioned multiple configurations are only some optional modes of the embodiment of the disclosure and should not form particular limits to the embodiment of the disclosure.

Optionally, in the embodiment of the disclosure, under the condition that multiple services exist, the terminal device may determine a service to be sent according to service priorities and may specifically determine the service to be sent according to priorities of logical channels and/or priorities of bearers and/or priorities of data streams.

In such a manner, in the embodiment of the disclosure, the terminal device directly notifies the attribute information of the data to be sent to the network device through the scheduling request, the grant for the data may be sent according to the attribute information of the data and then the terminal device may send the data to be sent according to the grant for the data, so that the problem of excessively long latency brought by multiple interactions may be solved.

Figure 3:
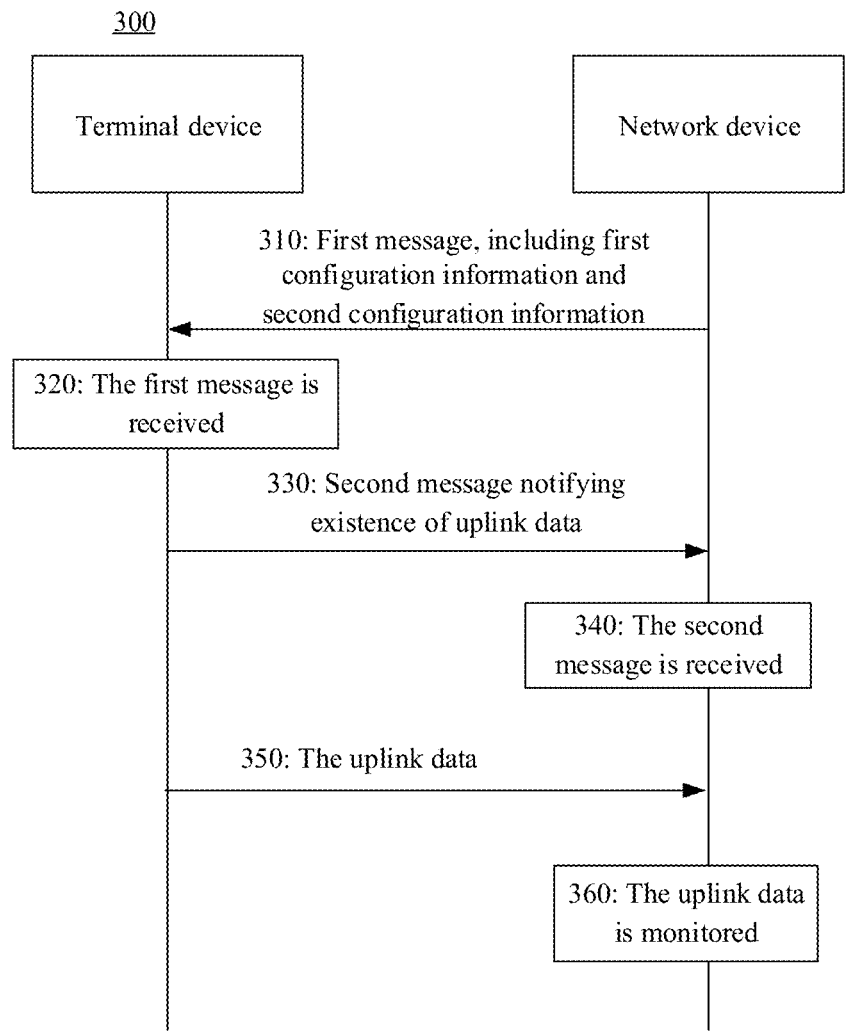
FIG. 3 is a schematic flowchart of a data transmission method according to an embodiment of the disclosure.

FIG. 3 is a schematic flowchart of a data transmission method 300 according to an embodiment of the disclosure. As shown in FIG. 3, the method 300 includes the following contents.

In 310, a network device sends a first message to a terminal device, the first message including first configuration information configured for the terminal device to send a second message and second configuration information configured for the terminal device to send uplink data and the second message being configured to notify the network device that the terminal device has uplink data to be sent.

Optionally, the first message may be high-layer signaling, for example, RRC-layer signaling or MAC-layer signaling.

Optionally, the first configuration information includes at least one of:

a code-domain resource configured to send the second message, a time-domain resource configured to send the second message, a frequency-domain resource configured to send the second message, a space-domain resource configured to send the second message and target received power for the second message.

Optionally, the second configuration information includes at least one of:

a basic parameter set adopted to send the uplink data, a transport block size adopted to send the uplink data, a modulation and coding scheme adopted to send the uplink data, maximum power for sending of the uplink data, a resource adopted to send the uplink data or a HARQ process number corresponding to the uplink data.

Optionally, the second configuration information includes identification information, and the identification information is configured to index at least one of:

the basic parameter set adopted to send the uplink data, the transport block size adopted to send the uplink data, the modulation and coding scheme adopted to send the uplink data, the maximum power for sending of the uplink data, the resource adopted to send the uplink data or the HARQ process number corresponding to the uplink data.

Optionally, a mapping relationship between identification information and each parameter may be predetermined by a protocol or configured for the terminal device by the network device.

Optionally, in the embodiment of the disclosure, the network device may send the second configuration information for each service in advance on the basis of the services the terminal device probably has.

For example, the second configuration information is configured according to at least one of a bearer, logical channel, data stream or data volume to be sent corresponding to the uplink data.

For example, the second configuration information may also be configured according to the data volume to be sent. For example, the network device may configure an uplink resource, maximum transmitted power, a modulation and coding scheme and the like for each data volume.

In 320, the terminal device receives the first message sent by the network device.

In 330, when the uplink data to be sent exists, the terminal device sends the second message to the network device according to the first configuration information to notify the network device that the terminal device has the uplink data to be sent.

For example, when the first configuration information includes the target received power for the second message, the terminal may determine transmitted power for the second message according to the target received power and path loss between the terminal device and the network device.

For example, when the first configuration information includes the code-domain resource, the time-domain resource, the frequency-domain resource and/or the space-domain resource, the second message is sent according to the resource indicated by the first configuration information.

Optionally, in the embodiment of the disclosure, the terminal device notifies attribute information of the uplink data to be sent to the network device through the second message.

In an implementation, the second message includes an indication field, and the indication field indicates the attribute information of the uplink data to be sent. The network device may acquire the attribute information of the uplink data to be sent by the terminal device through indication information contained in the second message sent by the terminal device.

In an implementation, the terminal device notifies the attribute information of the uplink data to be sent to the network device through at least one of the resource occupied by the second message or the target received power corresponding to the second message. Then, the network device may determine the target received power of the second message configured to notify the attribute information of the uplink data to be sent by the terminal device to the network device according to the attribute information of the uplink data to be sent and correspondences between attribute information of data and target received powers of a second message.

For example, the transmitted power is determined according to the path loss between the network device and the terminal device and the target received power for the second message; and the second message is sent in the transmitted power. Correspondingly, the network device acquires the attribute information of the uplink data to be sent by the terminal device through at least one of the resource occupied by the second message or the target received power corresponding to the second message.

For example, the terminal device may acquire the transmitted power P according to the following formula:

$$P = P\text{pathloss} + P\text{target} + \text{delta},$$

where Ppathloss is a path loss value calculated according to a downlink signal, Ptarget is an expected received power value configured for the scheduling request by the network device and delta is a power headroom configured by the network device.

It is to be understood that, in the embodiment of the disclosure, the expected received power value may be called a target received power value.

Optionally, in the embodiment of the disclosure, the terminal device calculates the transmitted power of the terminal device according to path loss of a downlink path, which may be applied to an uplink and downlink symmetric system.

Optionally, the resource occupied by the second message and configured to notify the attribute information of the uplink data to be sent to the network device includes at least one of:

the code-domain resource, the time-domain resource, the frequency-domain resource and the space-domain resource.

Optionally, the attribute information of the uplink data to be sent includes at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

Optionally, the second message includes a preamble.

Optionally, the second message includes the preamble and the indication field, and the indication field may be configured to indicate the attribute information of the uplink data to be sent by the terminal device.

Optionally, the indication field may be at a front-end position or rear-end position of the preamble.

In 340, the second message sent by the terminal device is received.

Optionally, after the second message sent by the terminal device is received, the network device sends a response message for the second message to the terminal device. Correspondingly, the terminal device receives the response message sent by the network device.

In 350, after the second message is sent, the uplink data to be sent is sent to the network device according to the second configuration information.

Optionally, in the embodiment of the disclosure, the terminal device, after the second message is sent and the response message is received, sends the uplink data to be sent to the network device.

Optionally, in the embodiment of the disclosure, the terminal device sends the uplink data to be sent to the network device according to the second configuration information after a predetermined time period from beginning of sending of the second message.

For example, the terminal device, after the second message is sent, may start a timer and, in case of a timeout of the timer, may send the uplink data to be sent to the network device.

In 360, after the second message is received, the uplink data sent by the terminal device is monitored.

Optionally, the network device, after the second message is received and the response message is sent, monitors the uplink data sent by the terminal device.

Optionally, in the embodiment of the disclosure, the network device monitors the uplink data sent by the terminal device after a predetermined time period from beginning of sending the second message.

For example, the network device, after the second message is sent, may start a timer and, in case of a timeout of the timer, may monitor the uplink data sent by the terminal device.

Optionally, under the condition that the attribute information of the uplink data to be sent by the terminal device is acquired through the second message, the network device monitors the uplink data sent by the terminal device according to the attribute information of the uplink data. Specifically, the data of the terminal device may be monitored in the uplink resource indicated by the second configuration information in 310.

For example, the attribute information includes bearer information, data stream information or logical channel information of the data to be sent, and then the data of the terminal device may be acquired according to the bearer information, the data stream information or the logical channel information.

For another example, when the attribute information includes the size of the data to be sent, the network device may monitor the data in the size and, after acquiring the data in the size, stops monitoring.

Optionally, in the embodiment of the disclosure, if the terminal device does not notify the attribute information of the data to be sent through the second message, the network device may acquire the data to be sent in a blind detection manner. Specifically, the data of the terminal device may be monitored in the uplink resource indicated by the second configuration information in 310.

It is to be understood that the uplink data mentioned in the embodiment of the disclosure may be state information of the terminal device such as a data buffer state, power headroom or uplink advance of the terminal device.

Optionally, in the embodiment of the disclosure, under the condition that multiple services exist, the terminal device may determine a service to be sent according to service priorities and may specifically determine the service to be sent according to priorities of logical channels and/or priorities of bearers and/or priorities of data streams.

In such a manner, in the embodiment of the disclosure, the network device sends the first message to the terminal device, the first message including the first configuration information configured for the terminal device to send the second message and the second configuration information configured for the terminal device to send the uplink data and the second message being configured to notify the network device that the terminal device has the uplink data to be sent, and the terminal device, when there is data to be sent, may send the second message to the network device according to the first configuration information and, after sending the second message, directly sends the uplink data to be sent, so that the problem of excessively long latency brought by the fact that the terminal device requests the network device for a grant only when there is data to be sent may be solved.

Figure 4:
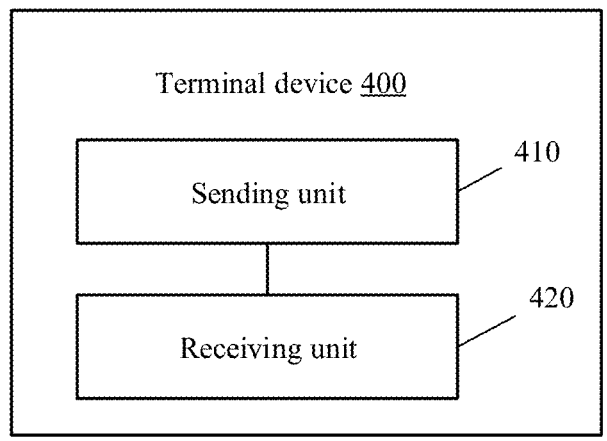
FIG. 4 is a schematic block diagram of a terminal device according to an embodiment of the disclosure.

FIG. 4 is a schematic block diagram of a terminal device 400 according to an embodiment of the disclosure. As shown in FIG. 4, the terminal device 400 includes a sending unit 410 and a receiving unit 420.

The sending unit 410 is configured to notify attribute information of uplink data to be sent by the terminal device to a network device through a scheduling request.

The receiving unit 420 is configured to receive indication information sent by the network device, the indication information indicating an uplink grant for the uplink data to be sent.

The sending unit 410 is configured to send the uplink data to be sent according to the uplink grant.

Optionally, the scheduling request includes an indication field, and the indication field indicates the attribute information of the uplink data to be sent.

The sending unit 410 is further configured to:

notify the attribute information of the uplink data to be sent to the network device through the indication field in the scheduling request.

Optionally, the sending unit 410 is further configured to:

notify the attribute information of the uplink data to be sent to the network device through at least one of a resource occupied by the scheduling request or target received power corresponding to the scheduling request.

Optionally, the resource occupied by the scheduling request and configured to notify the attribute information of the uplink data to be sent to the network device includes at least one of:

a code-domain resource, a time-domain resource, a frequency-domain resource or a space-domain resource.

Optionally, the sending unit 410 is further configured to:

determine the resource configured to send the scheduling request according to the attribute information of the uplink data to be sent and correspondences between attribute information of data and resources; and send the scheduling request according to the determined resource.

Optionally, the sending unit 410 is further configured to:

determine the target received power corresponding to the scheduling request configured to notify the attribute information of the uplink data to be sent according to the attribute information of the uplink data to be sent and correspondences between attribute information of data and target received powers of a scheduling request;

determine transmitted power according to path loss between the network device and the terminal device and the target received power corresponding to the scheduling request; and send the scheduling request in the transmitted power.

Optionally, the scheduling request includes a preamble.

Optionally, the scheduling request includes the preamble and the indication field, the indication field indicating the attribute information of the uplink data to be sent.

Optionally, the scheduling request is physical-layer signaling.

Optionally, the attribute information of the uplink data to be sent includes at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

Optionally, the uplink grant for the uplink data to be sent contains at least one of:

a basic parameter set adopted to send the uplink data to be sent, a transport block size adopted to send the uplink data to be sent, a modulation and coding scheme adopted to send the uplink data to be sent, maximum power for sending of the uplink data to be sent, a resource adopted to send the uplink data to be sent or a HARQ process number corresponding to the uplink data to be sent.

Optionally, the uplink grant for the uplink data to be sent includes identification information, and the identification information is configured to index at least one of:

the basic parameter set adopted to send the uplink data to be sent, the transport block size adopted to send the uplink data to be sent, the modulation and coding scheme adopted to send the uplink data to be sent, the maximum power for sending of the uplink data to be sent, the resource adopted to send the uplink data to be sent or the HARQ process number corresponding to the uplink data to be sent.

Optionally, the receiving unit 420 is further configured to:

receive configuration information sent by the network device, the configuration information indicating at least one of the following information and/or a mapping relationship between the following information:

attribute information of at least one service, the resource for sending the scheduling request, the target received power corresponding to the scheduling request and the basic parameter set.

Optionally, the terminal device 400 may be configured to execute corresponding operations executed by the terminal device in the method 200 and, for simplicity, will not be elaborated herein.

Figure 5:
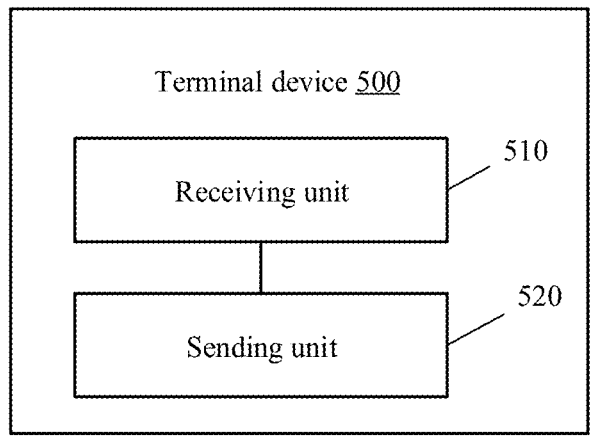
FIG. 5 is a schematic block diagram of a terminal device according to an embodiment of the disclosure.

FIG. 5 is a schematic block diagram of a terminal device 500 according to an embodiment of the disclosure. As shown in FIG. 5, the terminal device 500 includes a receiving unit 510 and a sending unit 520.

The receiving unit 510 is configured to receive a first message sent by a network device, the first message including first configuration information configured for the terminal device to send a second message and second configuration information configured for the terminal device to send uplink data and the second message being configured to notify the network device that the terminal device has uplink data to be sent.

The sending unit 520 is configured to, when the uplink data to be sent exists, send the second message to the network device according to the first configuration information.

The sending unit 520 is configured to, after the second message is sent, send the uplink data to be sent to the network device according to the second configuration information.

Optionally, the receiving unit 510 is further configured to receive a response message sent by the network device for the second message.

The sending unit 520 is further configured to, after the second message is sent and the response message is received, send the uplink data to be sent to the network device.

Optionally, the sending unit 520 is further configured to:

send the uplink data to be sent to the network device according to the second configuration information after a predetermined time period from beginning of sending of the second message.

Optionally, the second message includes an indication field, and the indication field indicates attribute information of the uplink data to be sent.

Optionally, the sending unit 520 is further configured to:

notify, by the terminal device, the attribute information of the uplink data to be sent to the network device through at least one of a resource occupied by the second message or target received power corresponding to the second message.

Optionally, the resource occupied by the second message and configured to notify the attribute information of the uplink data to be sent to the network device includes at least one of:

a code-domain resource, a time-domain resource, a frequency-domain resource or a space-domain resource.

Optionally, the sending unit 520 is further configured to:

determine the target received power of the second message configured to notify the attribute information of the uplink data to be sent by the terminal device to the network device, according to the attribute information of the uplink data to be sent and correspondences between attribute information of data and target received powers of a second message;

determine transmitted power according to path loss between the network device and the terminal device and the target received power for the second message; and send the second message in the transmitted power.

Optionally, the attribute information of the uplink data to be sent includes at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

Optionally, the second message includes a preamble.

Optionally, the first configuration information includes at least one of:

the code-domain resource configured to send the second message, the time-domain resource configured to send the second message, the frequency-domain resource configured to send the second message, the space-domain resource configured to send the second message or the target received power for the second message.

Optionally, the second configuration information includes at least one of:

a basic parameter set adopted to send the uplink data, a transport block size adopted to send the uplink data, a modulation and coding scheme adopted to send the uplink data, maximum power for sending of the uplink data, a resource adopted to send the uplink data or a HARQ process number corresponding to the uplink data.

Optionally, the second configuration information includes identification information, and the identification information is configured to index at least one of:

the basic parameter set adopted to send the uplink data, the transport block size adopted to send the uplink data, the modulation and coding scheme adopted to send the uplink data, the maximum power for sending of the uplink data, the resource adopted to send the uplink data or the HARQ process number corresponding to the uplink data.

Optionally, the second configuration information is configured according to at least one of a bearer, logical channel, data stream or data volume to be sent corresponding to the uplink data.

Optionally, the terminal device 500 may be configured to execute corresponding operations executed by the terminal device in the method 300 and, for simplicity, will not be elaborated herein.

Figure 6:
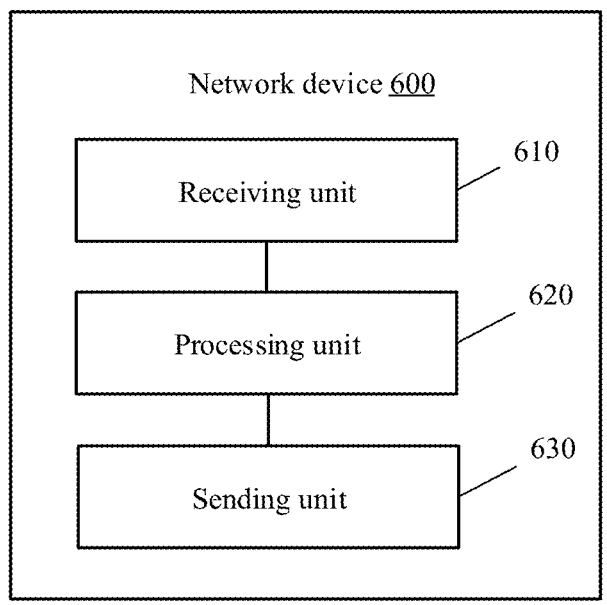
FIG. 6 is a schematic block diagram of a network device according to an embodiment of the disclosure.

FIG. 6 is a schematic block diagram of a network device 600 according to an embodiment of the disclosure. As shown in FIG. 6, the network device 600 includes a receiving unit 610, a processing unit 620 and a sending unit 630.

The receiving unit 610 is configured to receive a scheduling request sent by a terminal device.

The processing unit 620 is configured to acquire attribute information of uplink data to be sent by the terminal device through the scheduling request sent by the terminal device and determine an uplink grant for the uplink data to be sent by the terminal device according to the attribute information of the uplink data to be sent by the terminal device.

The sending unit 630 is configured to send indication information to the terminal device, the indication information indicating the uplink grant for the uplink data to be sent.

Optionally, the scheduling request includes an indication field, and the indication field indicates the attribute information of the uplink data to be sent by the terminal device.

The processing unit 620 is further configured to:

acquire the attribute information of the uplink data to be sent by the terminal device through the indication field in the scheduling request sent by the terminal device.

Optionally, the processing unit 620 is further configured to:

acquire the attribute information of the uplink data to be sent by the terminal device through at least one of a resource occupied by the scheduling request or received power corresponding to the scheduling request.

Optionally, the resource occupied by the scheduling request and configured to for the network device to acquire the attribute information of the uplink data to be sent includes at least one of:

a code-domain resource, a time-domain resource, a frequency-domain resource or a space-domain resource.

Optionally, the scheduling request includes a preamble.

Optionally, the scheduling request includes the preamble and the indication field, the indication field indicating the attribute information of the uplink data to be sent.

Optionally, the scheduling request is physical-layer signaling.

Optionally, the attribute information of the uplink data to be sent by the terminal device includes at least one of:

a size of the uplink data to be sent, data stream information corresponding to the uplink data to be sent, bearer information corresponding to the uplink data to be sent, logical channel information corresponding to the uplink data to be sent or QoS level information of the uplink data to be sent.

Optionally, the uplink grant for the uplink data to be sent by the terminal device contains at least one of:

a basic parameter set adopted to send the uplink data to be sent, a transport block size adopted to send the uplink data to be sent, a modulation and coding scheme adopted to send the uplink data to be sent, maximum power for sending of the uplink data to be sent, a resource adopted to send the uplink data to be sent or a HARQ process number corresponding to the uplink data to be sent.

Optionally, the uplink grant for the uplink data to be sent by the terminal device includes identification information, and the identification information is configured to index at least one of:

the basic parameter set adopted to send the uplink data to be sent, the transport block size adopted to send the uplink data to be sent, the modulation and coding scheme adopted to send the uplink data to be sent, the maximum power for sending of the uplink data to be sent, the resource adopted to send the uplink data to be sent or the HARQ process number corresponding to the uplink data to be sent.

Optionally, the sending unit 630 is further configured to:

send configuration information to the terminal device, the configuration information indicating attribute information of at least one type of data and the configuration information indicating at least one of the following information and/or a mapping relationship between the following information:

attribute information of at least one service, the resource for sending the scheduling request, the target received power corresponding to the scheduling request and the basic parameter set.

Optionally, the network device 600 may be configured to execute corresponding operations executed by the network device in the method 200 and, for simplicity, will not be elaborated herein.

Figure 7:
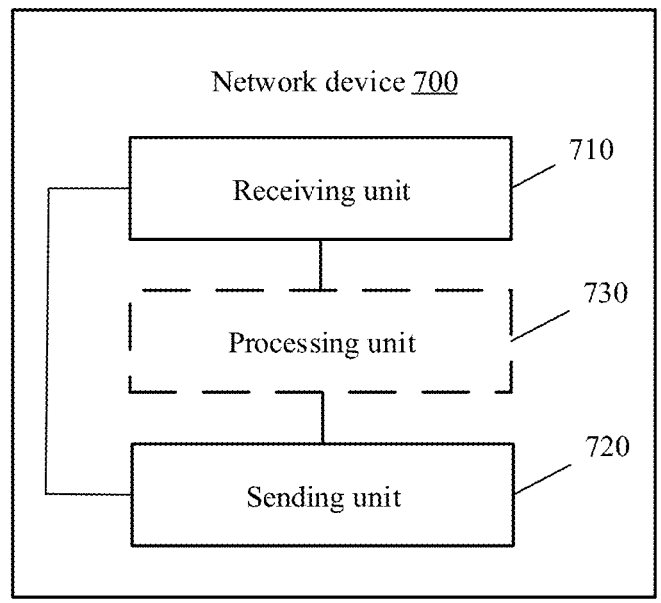
FIG. 7 is a schematic block diagram of a network device according to an embodiment of the disclosure.

FIG. 7 is a schematic block diagram of a network device 700 according to an embodiment of the disclosure. As shown in FIG. 7, the network device 700 includes a receiving unit 710 and a sending unit 720.

The sending unit 720 is configured to send a first message to a terminal device, the first message including first configuration information configured for the terminal device to send a second message and second configuration information configured for the terminal device to send uplink data and the second message being configured to notify the network device that the terminal device has uplink data to be sent.

The receiving unit 710 is configured to receive the second message sent by the terminal device and, after the second message is received, monitor, by the network device, the uplink data sent by the terminal device.

Optionally, the sending unit 720 is further configured to:

send a response message for the second message to the terminal device.

The receiving unit 710 is further configured to:

after the second message is received and the response message is sent, monitor the uplink data sent by the terminal device.

Optionally, the receiving unit 710 is further configured to:

monitor the uplink data sent by the terminal device after a predetermined time period from beginning of sending the second message.

Optionally, as shown in FIG. 7, the network device 700 further includes a processing unit 730, configured to acquire attribute information of the uplink data to be sent by the terminal device through the second message.

The receiving unit 710 is further configured to monitor the uplink data sent by the terminal device according to the attribute information of the uplink data.

Optionally, the processing unit 710 is further configured to:

acquire the attribute information of the uplink data to be sent by the terminal device through the indication information contained in the second message sent by the terminal device.

Optionally, the processing unit 730 is further configured to:

acquire the attribute information of the uplink data to be sent by the terminal device through at least one of a resource occupied by the second message or target received power corresponding to the second message.

Optionally, the resource occupied by the second message and configured to notify the attribute information of the uplink data to the network device includes at least one of:

a code-domain resource, a time-domain resource, a frequency-domain resource or a space-domain resource.

Optionally, the attribute information of the uplink data includes at least one of:

a size of the uplink data, data stream information corresponding to the uplink data, bearer information corresponding to the uplink data, logical channel information corresponding to the uplink data or QoS level information of the data.

Optionally, the second message includes a preamble.

Optionally, the first configuration information includes at least one of:

the code-domain resource configured to send the second message, the time-domain resource configured to send the second message, the frequency-domain resource configured to send the second message, the space-domain resource configured to send the second message or the target received power for the second message.

Optionally, the second configuration information includes at least one of:

a basic parameter set adopted to send the uplink data, a transport block size adopted to send the uplink data, a modulation and coding scheme adopted to send the uplink data, maximum power for sending of the uplink data, a resource adopted to send the uplink data or a HARQ process number corresponding to the uplink data.

Optionally, the second configuration information includes identification information, and the identification information is configured to index at least one of:

the basic parameter set adopted to send the uplink data, the transport block size adopted to send the uplink data, the modulation and coding scheme adopted to send the uplink data, the maximum power for sending of the uplink data, the resource adopted to send the uplink data or the HARQ process number corresponding to the uplink data.

Optionally, the second configuration information is configured according to at least one of a bearer, logical channel, data stream or data volume to be sent corresponding to the uplink data.

Optionally, the network device 700 may be configured to execute corresponding operations executed by the network device in the method 300 and, for simplicity, will not be elaborated herein.

Figure 8:
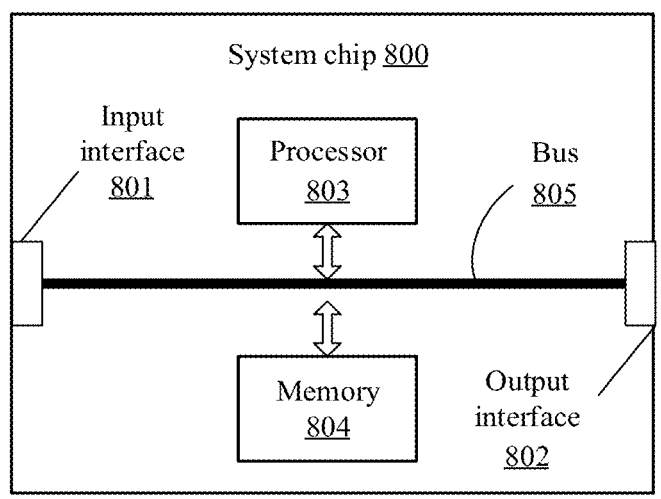
FIG. 8 is a schematic block diagram of a system chip according to an embodiment of the disclosure.

FIG. 8 is a schematic structure diagram of a system chip according to an embodiment of the disclosure. The system chip 800 of FIG. 8 includes an input interface 801, output interface 802, processor 803 and memory 804 which are connected through a bus 805. The processor 803 is configured to execute a code in the memory 804.

Optionally, when the code is executed, the processor 803 implements a method executed by a terminal device in the method embodiments. For simplicity, no more elaborations will be made herein.

Optionally, when the code is executed, the processor 803 implements a method executed by a network device in the method embodiments. For simplicity, no more elaborations will be made herein.

Figure 9:
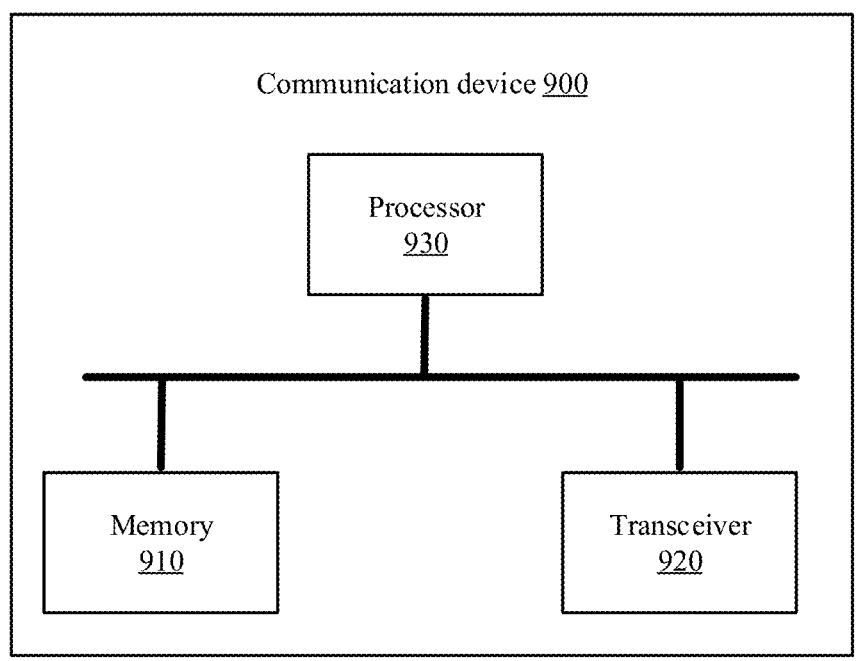
FIG. 9 is a schematic block diagram of a communication device according to an embodiment of the disclosure.

FIG. 9 is a schematic block diagram of a communication device 900 according to an embodiment of the disclosure. The communication device 900 includes a memory 910, a transceiver 902 and a processor 930.

The memory 910 is configured to store a program.

The transceiver 920 is configured to communicate with another device.

The processor 930 is configured to execute the program in the memory 910.

Optionally, when a code is executed, the processor 930 may implement each operation executed by a terminal device in the method. For simplicity, no more elaborations will be made herein.

Optionally, when the code is executed, the processor 930 may implement each operation executed by a network device in the method. For simplicity, no more elaborations will be made herein.

It is to be understood that, in the embodiment of the disclosure, the processor 930 may be a Central Processing Unit (CPU) and the processor 910 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 910 may include a Read-Only Memory (ROM) and a Random Access Memory (RAM) and provides an instruction and data for the processor 930. A part of the memory 910 may further include a nonvolatile RAM. For example, the memory 910 may further store information of a device type.

In an implementation process, each step of the method may be completed by an integrated logic circuit of hardware in the processor 530 or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory, and the processor 930 reads information in the memory, and completes the steps of the methods in combination with hardware. No more detailed descriptions will be made herein to avoid repetitions.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more two units may also be integrated in a unit.

When being realized in form of software functional unit and sold or used as an independent product, the function may also be stored in a computer-readable storage medium.

Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for data transmission, comprising:
   notifying, by a terminal device, attribute information of uplink data to be sent by the terminal device to a network device through a scheduling request, comprising:
      notifying, by the terminal device, the attribute information of the uplink data to be sent to the network device through a resource occupied by the scheduling request, wherein the resource occupied by the scheduling request and configured to notify the attribute information of the uplink data to be sent to the network device comprises at least one of a time-domain resource or a frequency-domain resource;
   receiving, by the terminal device, indication information sent by the network device, the indication information indicating an uplink grant for the uplink data to be sent; and
   sending, by the terminal device, the uplink data to be sent according to the uplink grant;
   wherein the attribute information of the uplink data to be sent comprises at least one of:
   data stream information corresponding to the uplink data to be sent, bearer information corresponding to the uplink data to be sent, or Quality of Service (QoS) level information of the uplink data to be sent;
   wherein notifying, by the terminal device, the attribute information of the uplink data to be sent to the network device through the resource occupied by the scheduling request comprises:
   determining the resource configured to send the scheduling request according to the attribute information of the uplink data to be sent and correspondences between attribute information of data and resources; and
   sending the scheduling request according to the determined resource.

2. The method of claim 1, wherein the scheduling request comprises an indication field, and the indication field indicates the attribute information of the uplink data to be sent; and
   notifying, by the terminal device, the attribute information of the uplink data to be sent by the terminal device to the network device through the scheduling request comprises:

notifying, by the terminal device, the attribute information of the uplink data to be sent to the network device through the indication field in the scheduling request.

3. The method of claim 1 wherein the scheduling request comprises a preamble.

4. The method of claim 3, wherein the scheduling request comprises the preamble and the indication field, the indication field indicating the attribute information of the uplink data to be sent.

5. The method of claim 1, wherein the scheduling request is physical-layer signaling.

6. The method of claim 1, wherein the uplink grant for the uplink data to be sent contains at least one of:
a basic parameter set adopted to send the uplink data to be sent, a transport block size adopted to send the uplink data to be sent, a modulation and coding scheme adopted to send the uplink data to be sent, a maximum power for sending of the uplink data to be sent, a resource adopted to send the uplink data to be sent or a Hybrid Automatic Repeat reQuest (HARQ) process number corresponding to the uplink data to be sent.

7. The method of claim 1, wherein the uplink grant for the uplink data to be sent comprises identification information, and the identification information is configured to index at least one of:
a basic parameter set adopted to send the uplink data to be sent, a transport block size adopted to send the uplink data to be sent, a modulation and coding scheme adopted to send the uplink data to be sent, a maximum power for sending of the uplink data to be sent, a resource adopted to send the uplink data to be sent or a Hybrid Automatic Repeat reQuest (HARQ) process number corresponding to the uplink data to be sent.

8. The method of claim 1, before notifying, by the terminal device, the attribute information of the uplink data to be sent by the terminal device to the network device through the scheduling request, further comprising:
receiving configuration information sent by the network device, the configuration information indicating one of:
at least one of attribute information of at least one service, the resource for sending the scheduling request, the target received power corresponding to the scheduling request or the basic parameter set; or
a mapping relationship between the attribute information of at least one service, the resource for sending the scheduling request, the target received power corresponding to the scheduling request and the basic parameter set.

9. A data transmission method, comprising:
acquiring, by a network device, attribute information of uplink data to be sent by a terminal device through a scheduling request sent by the terminal device, comprising:
receiving, by the network device, the scheduling request from the terminal device; and
acquiring, by the network device, the attribute information of the uplink data to be sent by the terminal device through a resource occupied by the scheduling request, wherein the resource occupied by the scheduling request and configured to notify the attribute information of the uplink data to be sent to the network device comprises at least one of a time-domain resource or a frequency-domain resource; and the resource occupied by the scheduling request is determined by the terminal device according to the attribute information of the uplink data to be sent and correspondences between attribute information of data and resources;
determining, by the network device, an uplink grant for the uplink data to be sent by the terminal device according to the attribute information of the uplink data to be sent by the terminal device; and
sending, by the network device, indication information to the terminal device, the indication information indicating the uplink grant for the uplink data to be sent;
wherein the attribute information of the uplink data to be sent comprises at least one of:
data stream information corresponding to the uplink data to be sent, bearer information corresponding to the uplink data to be sent, or Quality of Service (QoS) level information of the uplink data to be sent.

10. A terminal device, comprising:
a memory having stored instructions;
a processor for executing the instructions to:
notify attribute information of uplink data to be sent by the terminal device to a network device through a scheduling request;
receive indication information sent by the network device, the indication information indicating an uplink grant for the uplink data to be sent; and
send the uplink data to be sent according to the uplink grant;
wherein the attribute information of the uplink data to be sent comprises at least one of:
data stream information corresponding to the uplink data to be sent, bearer information corresponding to the uplink data to be sent, or Quality of Service (QoS) level information of the uplink data to be sent;
wherein the processor is further configured to execute the instructions to:
notify the attribute information of the uplink data to be sent to the network device through a resource occupied by the scheduling request, wherein the resource occupied by the scheduling request and configured to notify the attribute information of the uplink data to be sent to the network device comprises at least one of a time-domain resource or a frequency-domain resource;
wherein the processor is further configured to execute the instructions to:
determine the resource configured to send the scheduling request according to the attribute information of the uplink data to be sent and correspondences between attribute information of data and resources; and
send the scheduling request according to the determined resource.

11. The terminal device of claim 10, wherein the processor is further configured to execute the instructions to:
receive configuration information sent by the network device, the configuration information indicating one of:
at least one of attribute information of at least one service, the resource for sending the scheduling request, the target received power corresponding to the scheduling request or the basic parameter set; or
a mapping relationship between the attribute information of at least one service, the resource for sending the scheduling request, the target received power corresponding to the scheduling request and the basic parameter set.

* * * * *